United States Patent [19]
Sugie et al.

[11] Patent Number: 5,418,052
[45] Date of Patent: May 23, 1995

[54] HOT MELT ADHESIVE COMPOSITION

[75] Inventors: Masaharu Sugie, Osaka; Masao Okkotsu, Nishinomiya, both of Japan

[73] Assignee: National Starch and Chemical Investment Holding Corporation, Wilmington, Del.

[21] Appl. No.: 807,527

[22] Filed: Dec. 13, 1991

Related U.S. Application Data

[60] Division of Ser. No. 670,504, Mar. 15, 1991, abandoned, which is a continuation of Ser. No. 465,865, Jan. 12, 1990, abandoned.

[30] Foreign Application Priority Data

Nov. 16, 1987 [JP] Japan .................................. 1-298708

[51] Int. Cl.$^6$ .................. B32B 7/12; B32B 15/04; A61F 13/20
[52] U.S. Cl. .................................. 428/261; 428/355; 604/366; 524/505
[58] Field of Search ............... 428/261, 355; 604/366

[56] References Cited

U.S. PATENT DOCUMENTS

| | | | |
|---|---|---|---|
| 4,136,699 | 1/1979 | Collins et al. | 128/290 |
| 4,526,577 | 7/1985 | Schmidt, Jr. et al. | 604/366 |
| 4,609,697 | 9/1986 | Albers | 524/505 |
| 4,622,359 | 11/1986 | Tsuchida et al. | 524/505 |
| 4,704,110 | 11/1987 | Raykovitz et al. | 604/366 |
| 4,822,653 | 4/1989 | Kauffman et al. | 524/505 |
| 4,944,993 | 7/1990 | Raykovitz et al. | 428/290 |

FOREIGN PATENT DOCUMENTS 0104005 3/1984 European Pat. Off. .
0302394 2/1989 European Pat. Off. .

OTHER PUBLICATIONS

European Search Report, Application No. 90 12 0943.
Technical Bulletin (Shell)–1989 Shell Elastomer, Cariflex TR/Kraton G.
Technical Bulletin (Kuraray)–1989 Septon, Elastomer.

*Primary Examiner*—James D. Withers
*Assistant Examiner*—Kathryne E. Shelborne
*Attorney, Agent, or Firm*—Jane E. Gennaro

[57] ABSTRACT

This invention concerns a hot melt adhesive composition for preventing slipping which is applied to parts of the surfaces of paper diapers of the type which require diapers covers, sanitary napkins, etc., in order to prevent the said diapers or napkins from slipping inside diaper covers or underwear.

7 Claims, No Drawings

HOT MELT ADHESIVE COMPOSITION

This is a divisional of application Ser. No. 07/670,504, filed on 15 Mar. 1991, which is a continuation of application Ser. No. 07/465,865, filed on 12 Jan. 1990, both now abandoned.

BACKGROUND OF THE INVENTION

This invention concerns a hot melt adhesive composition for preventing slipping which is applied to parts of the surfaces of paper diapers of the type which require diaper cover, sanitary napkins, etc., in order to prevent the said diapers or napkins from slipping inside diaper covers or underwear.

CONVENTIONAL TECHNOLOGY AND PROBLEMS IT POSES

Hot melt adhesives with synthetic rubbers as base polymers, to which tackifying resins and plasticizing oils are added, have been used up to now as slippage-prevention adhesives, which are applied to parts of the surfaces of paper diapers and napkins. Among the important performances required of such hot melt adhesives are: (1) that they be soft, white or colorless, and odorless; (2) that they have excellent initial adhesiveness to the diaper cover or underwear to which they are to be adhered, and that this adhesiveness be excellent from low to high temperatures; and (3) that no adhesive remain on the diaper cover or underwear when the paper diaper or napkin is removed after use. However, among conventional hot melt adhesives, none satisfy all of these requirements in a superior way. For example, the hot melt adhesives which have been principally used up to now have had the difficulty that they are compounded with large quantities of plasticizing oil, since their hand (i.e., feel) has been considered important, but when used with napkins, etc., low-molecular-weight substances in the adhesive exude in liquid form when the adhesive atmosphere (atmosphere around the adhesive) is warmed to a high temperature by the body heat, so that in the end the underlayer (underwear, etc.) is dirtied. In contrast, to this, the use of styrene-ethylene-butylene-styrene block copolymers (SEBS) has recently come to be preferred for the synthetic rubber base. These SEBS can accept an extremely large quantity of plasticizing oil in their polymer skeletons, compared to styrene-isoprene-styrene block copolymers (SIS) and styrene-butadiene-styrene copolymers (SBS), so that they have the advantage that a very small quantity of oil exudes from the base polymer even when the temperature rises. However, when they are used for long periods of time in body temperature atmospheres, they have the drawback that the hot melt adhesive gradually softens and penetrates into the underlayer to which (the napkin, etc.) is adhering; the apparent adhesive force greatly increases, and at the same time the cohesive force (the force which resists peeling off) is reduced, so that the adhesive layer suffer cohesion breakdown when the napkin, etc. is removed, and some adhesive remains on the underlayer. In order to solve this problem, the best approach is to reduce the quantity of the plasticizing oil in the composition, but if the quantity of the plasticizing oil is small, the initial adhesive force is greatly reduced, and at the same time the problem arises of the adhesive becoming hard and causing slipping to occur easily during use. Therefore, the quantity of plasticizing oil in the composition is adjusted to minimize both of these drawbacks, but at present a satisfactory hot melt adhesive for preventing slipping has not necessarily been obtained.

This invention was made with this situation in mind; its purpose is to provide a hot melt adhesive composition which combines a satisfactory slippage-preventing effect with a satisfactory separating ability from the underlayer, which could not coexist previously, and also has a soft hand.

SUMMARY OF THE INVENTION

In order to accomplish this purpose, the hot melt adhesive composition of this invention contains 5–30 wt % styrene-ethylene-propylene-styrene block copolymer, 5–30 wt % styrene-ethylene-butylene-styrene block copolymer, 20–70 wt % hydrogenated tackifying resin ingredient, and 10–50 wt % plasticizing oil ingredient.

OPERATION

That is, the inventors performed a series of studies in order to obtain adhesive compositions which would combine a satisfactory slippage-preventing effect with a satisfactory separating ability from the underlayer, which could not coexist previously. As a result, they discovered that, if specific quantities of SEPS and SEBS were compounded as the synthetic rubber ingredient which serves as the base polymer of the hot melt adhesive composition, a specific quantity of hydrogenated resin was compounded as a tackifying resin ingredient, and a specific quantity of plasticizing oil was also compounded, it was possible to obtain a hot melt adhesive with excellent slippage-preventing effect and underlayer-separating ability at the same time; thus, this invention was achieved.

DETAILED DESCRIPTION

The hot melt adhesive composition of this invention contains SEPS and SEBS synthetic rubber ingredients, a tackifying resin ingredient, and a plasticizing oil ingredient, each in a specific proportion.

The aforementioned SEPS is a copolymer which contains a mixture of an ethylene structure and a propylene structure between styrene polymer blocks on the ends; in this two-phase structure, the styrene phase functions as hard segments and the ethylene-propylene phase as a soft segment. The SEPS ordinarily has the same oil-retaining ability as SEBS, or a greater ability, and the plasticizing oil does not exude over time. Moreover, it also has excellent initial adhesive force, without a reduction of the cohesive force, and a stable adhesive force in the range from room temperature to the body temperature region can be obtained. At the same time, one can also obtain a soft hand. This SEPS can be obtained simply by, for example, hydrogenating the isoprene polymer ingredient of a styrene-isoprene-styrene block polymer (SIS). However, when used in this invention, the aforementioned SEPS should have a styrene content of 10–40 wt % (abbreviated below as "%"). If the styrene content is less than 10%, the cohesive force tends to be markedly reduced, whereas if it is over 40% a tendency is seen for the stability of the adhesive force from room temperature to the body temperature range to become poorer. The quantity of the aforementioned SEPS in the composition must be 5–30% of the whole composition; a preferable proportion is 5–20%, and it is still more preferable for it to be 5–15%. If the proportion of the SEPS is too small, the adhesiveness is inferior, and if it is too great, the cohesive force is reduced.

Moreover, the SEBS used together with the aforementioned SEPS is a copolymer which is formed by mixing an ethylene structure and a butylene structure between styrene polymer blocks on the ends; it has a two-phase structure in which the styrene phase functions as hard segments and the ethylene-butylene phase functions as a soft segment. This SEBS can be obtained simply by, for example, hydrogenating the butadiene polymer part of a styrene-butadiene-styrene block copolymer (SBS). However, when used in this invention, the aforementioned SEBS should have a styrene content of 10-35%. If the styrene content is less than 10%, a tendency is seen for the cohesive force in the body temperature region to become poorer, whereas if it is greater than 35%, a tendency is seen for the adhesive force at room temperature to become extremely poor. The quantity of the aforementioned SEBS must be 5-30% of the whole composition; a preferable proportion is 7-25%, and it is still more preferable for it to be 10-20%. If the proportion is too great, the adhesive force is reduced and the hand becomes hard; in addition, the melt viscosity is raised, and the application operability becomes poor.

On the other hand, the tackifying resin ingredient used in this invention has a low molecular weight; it increases the wettability of the composition and at the same time imparts an initial adhesive force; it must reduce the viscosity of the composition as a whole and improve the application operability of the adhesive. Moreover, it is desirable for it to be colorless or white and odorless. Therefore, in this invention, it is especially necessary to use a hydrogenated resin in this invention. That is, since hydrogenated resins have excellent miscibility with the aforementioned SEPS and SEBS, a wide range of adhesiveness is obtained, from low temperatures to high temperatures, and at the same time its thermal stability is excellent, since it has no double bonds in its chemical structure. As such tackifying resin ingredients, hydrogenated aromatic petroleum resins, hydrogenated aliphatic petroleum resins, and hydrogenated terpene resins are desirable. Furthermore, the softening temperature of the aforementioned resin is not especially limited; it may be a solid or liquid at room temperature, but liquid ones have better effects as plasticizers. Furthermore, if the quantity of the aforementioned tackifying resin ingredient in the composition is too great, the hand will become hard and the room-temperature adhesiveness will become extremely poor; if it is too small, the wettability with respect to the materials being adhered will be reduced, and the initial adhesive force will become poor. Therefore, the quantity of at least one kind of tackifying resin ingredient in the compound must be 40-70%, preferably 50-70%, and still more preferably 55-65%.

The plasticizing oil ingredient used in this invention may be any one which is ordinarily used in hot melt adhesive compositions, but it is preferable to use those which have lower molecular weights than the aforementioned tackifying resin ingredient and which play the role of viscosity regulators, as well as increasing the low-temperature tackiness and softening the composition. As such plasticizing oil ingredients, oils which combine paraffin, naphthene, and aromatic ingredients are ordinarily used, but if the proportion of the paraffin ingredient is large, the thermal stability is increased, and if the proportion of the naphthene ingredient is large, the low-temperature adhesiveness is improved. Furthermore, if the proportion of the aforementioned plasticizing oil is too small, the hand becomes hard and the low-temperature adhesiveness is reduced; if it is too great, the high-temperature adhesiveness is reduced. Therefore, it must be 10-50%, preferably 20-50%, and still more preferably 20-40%.

Besides the aforementioned necessary ingredients, the hot melt adhesive composition of this invention may also contain various kinds of additives which are used in conventional hot melt adhesive compositions. These additives include hindered phenol stabilizers, for improving the heat resistance, oxidation resistance, and photo-stability [of the adhesive], ultraviolet ray absorbers, etc. When the aforementioned hindered phenol stabilizers are used, the quantity compounded should be 0.1-1%. When the aforementioned ultraviolet ray absorbers are used, the quantity compounded should be 0.1-0.5%.

Other synthetic rubber ingredients and resin ingredients which are ordinarily used in hot melt adhesive compositions may also be compounded [in this adhesive] for the purpose of regulating the softness, wettability, adhesiveness, melt viscosity, and softening point, as well as reducing the cost. Such optional ingredients include, for example, synthetic rubbers such as SIS and SBS; ethylene copolymers such as ethylene-vinyl acetate copolymers and ethylene-ethyl acrylate copolymers; and olefin resins such as atactic polypropylene, isotactic polypropylene, propylene-1-butene copolymers, propylene-1-butene-ethylene triple copolymers, etc. Moreover, liquid polybutene, liquid polyisobutene, liquid polyisoprene, or other softeners may also be compounded [in this adhesive]. The proportions of these optional ingredients in the composition should ordinarily be 20% or less in colorless or white adhesives, and 15% or less in colored products. Furthermore, since these optional ingredients tend to hinder the excellent properties obtained from the aforementioned necessary ingredients, their quantities should be kept as small as possible.

The hot melt adhesive composition of this invention can be obtained by, for example, putting the aforementioned raw materials into a melting, stirring, and mixing pot and heating while stirring.

The following examples further illustrate certain preferred embodiments of the invention and are not intended to be illustrative of all embodiments.

Actual Examples 1-12

The raw materials shown in Table 1 below were compounded according the compositions shown below, and melted and kneaded at approximately 150° C, to obtain the hot melt adhesive composition desired.

TABLE 1

| | | | Actual Examples | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| Synthetic Rubber | SEPS | KL-2063 (Kurary Co.) Ml = 30 g/10 min | — | — | — | 20 | 10 | 5 | — | 10 | 20 | — | — | 15 |

TABLE 1-continued

| | | | Actual Examples | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| | | St = 13 wt % KL-2043 (Kurary Co.) Ml = 13 g/10 min | 5 | 15 | 30 | — | — | — | 15 | — | — | 20 | 10 | — |
| | SEBS | St = 13 wt % Kraton G-1650 (Shell) | 10 | 10 | 5 | 5 | 15 | 30 | 15 | — | — | 10 | — | — |
| | | St = 30 wt % Kraton G-1652 (Shell) St = 30 wt % | — | — | — | — | — | — | — | 10 | 10 | — | 20 | 20 |
| Tackifier Resin | Hydrogenated Terpene Resin | Clearon M105 | 60 | 50 | 40 | — | — | — | 40 | 70 | — | — | — | 20 |
| | Hydrogenated Aromatic Resin | Arkon P100 | — | — | — | 55 | 45 | 35 | — | — | 50 | 20 | 30 | — |
| | Hydrogenated Aliphatic Resin | Eastotak H-100W | — | — | — | — | — | — | — | — | — | — | — | 20 |
| Plasticized Oil | Naphthene Type | Shellflex 371N (Shell) | — | — | — | 20 | 30 | 30 | — | — | 20 | 50 | 40 | 25 |
| | Paraffin Type | Kristol 352 (Exxon) | 25 | 25 | 25 | — | — | — | 30 | 10 | — | — | — | — |
| Antioxidant | Irganox 1010 (Ciba Geigy) | | 1 | 1 | 1 | 1 | 1 | 1 | 1 | 1 | 1 | 1 | 1 | 1 |
| Ultraviolet Absorber | Tinuvin P (Ciba Geigy) | | 0.5 | 0.5 | 0.5 | 0.5 | 0.5 | 0.5 | 0.5 | 0.5 | 0.5 | 0.5 | 0.5 | 0.5 |
| Total | | | 101.5 | 101.5 | 101.5 | 101.5 | 101.5 | 101.5 | 101.5 | 101.5 | 101.5 | 101.5 | 101.5 | 101.5 |

The properties of the aforementioned actual example articles were measured by the methods described below, and the results are shown in Table 2 below.

Initial adhesive force:

The hot melt adhesive compositions, applied to PET films to a thickness of 50 μm in a 25° C. atmosphere, were stuck to underwear underlayers in an area 2.54 cm×20 cm, a load of 1 kg was applied, and this was left standing for 1 hour. The peeling strength was then measured with a tensile tester (according to JIS Z 0237).

Adhesive force over time:

Test pieces made in the same manner as in the aforementioned adhesive force measurement were left standing for 8 hours with a 1 kg weight in a 40° C. atmosphere. The peeling strength was then measured with a tensile tester (according to JIS Z 0237).

Ability of adhesive to be peeled from underlayer:

After the aforementioned test of the adhesive force over time was performed, the peeled surface of the underwear underlayer was examined. If no hot melt adhesive composition at all remained on it, the sample was graded ○; if some remained, it was graded Δ, and if all of the composition remained, it was graded ×.

Thermal stability:

(1) Hue

The hues of the hot melt adhesive compositions, after they were left standing for 72 hours in a 180° C. atmosphere, were judged by eye. Those which were completely colorless or white were graded ●; those which were almost colorless or close to white were graded ○; those which were some-what colored were graded Δ; and those which were clearly colored were graded ×.

(2) Odor

The odors of hot melt adhesive compositions which were given the same thermal histories as in the aforementioned hue observation were evaluated by a functional test (10 panel members). Those which were completely odorless were graded ●; those which were almost odorless were graded ○; those which had some odor were graded Δ; and those which had clear odors were graded ×.

TABLE 2

| | | Actual Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Initial Adhesive Force (at 25° C.) | Silk underlayer | 400 | 400 | 450 | 400 | 500 | 450 | 450 | 350 | 450 | 400 | 350 | 400 |
| | Nylon underlayer | 300 | 400 | 450 | 400 | 400 | 450 | 400 | 350 | 450 | 400 | 300 | 300 |
| | Polyester underlayer | 300 | 400 | 350 | 350 | 300 | 400 | 300 | 350 | 450 | 400 | 300 | 400 |
| Adhesive Force over time (at 40° C.) | Silk underlayer | 400 | 400 | 500 | 400 | 500 | 400 | 350 | 350 | 400 | 300 | 350 | 400 |
| | Nylon underlayer | 350 | 350 | 400 | 400 | 400 | 400 | 400 | 350 | 450 | 300 | 350 | 400 |
| | Polyester underlayer | 350 | 350 | 400 | 300 | 300 | 350 | 350 | 300 | 400 | 300 | 350 | 400 |
| Peeling ability of adhesive underlayer | | ○ | ○ | ○ | ○ | ○ | ○ | ○ | ○ | ○ | ○ | ○ | ○ |
| Thermal Ability | Hue (at 180° C.) | ○ | ● | ● | ● | ○ | ○ | ● | ● | ● | ○ | ○ | ○ |
| | Odor | ○ | ○ | ○ | ○ | ○ | ○ | ○ | ○ | ○ | ○ | ○ | ○ |

TABLE 2-continued

| | Actual Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| (at 180° C.) | | | | | | | | | | | | |

Comparison Examples 1–13

Thirteen comparison example articles with different composition proportions from the aforementioned actual examples were prepared. These compositions are shown in Table 3 below. The properties of these comparison example articles were evaluated in the same manner as in the aforementioned actual examples. The results are shown in Table 4 below.

in the results in Table 2 above, show excellent properties in all these items.

EFFECTIVENESS OF INVENTION

As shown above, the hot melt adhesive composition of this invention has excellent initial adhesiveness, so that when it is used to prevent slipping by being applied to part of the surface of a napkin, etc., slipping between the napkin, etc., and the underwear underlayer, etc., is

TABLE 3

| | | | Comparison Examples | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Synthetic Rubber | SEPS | KL-2063 (Kuraray) | — | — | — | — | — | 3 | 35 | — | 10 | — | — | 15 | — |
| | | KL-2043 (Kuraray) | — | — | 15 | — | — | — | — | 20 | — | 15 | 10 | — | 10 |
| | SEBS | Kraton G-1650 (Shell) | 20 | — | — | — | — | 20 | — | 3 | 35 | — | — | — | 5 |
| | | Kraton G-1652 (Shell) | — | 20 | — | — | — | — | 10 | — | — | 15 | 5 | 15 | — |
| | SIS | Kraton TR1107 (Shell) | — | — | — | 20 | — | — | — | — | — | — | — | — | — |
| | SBS | Kraton TR1102 (Shell) | — | — | — | — | 20 | — | — | — | — | — | — | — | 30 |
| Tackifier Resin | Hydrogenated Terpene Resin | Clearon M105 | 50 | 25 | 10 | 15 | 50 | — | — | — | — | 35 | 75 | — | — |
| | Hydrogenated Aromatic Resin | Arkon P100 | — | 20 | 45 | — | — | 47 | — | 47 | — | — | — | 58 | — |
| | Hydrogenated Aliphatic Resin | Ensio Tak H-1005 | — | — | — | 40 | — | — | 30 | — | 30 | — | — | — | — |
| Plasticized Oil | Naphthene type | Shellflex 371H (Shell) | — | 35 | — | 25 | 30 | 30 | — | — | 30 | 35 | 10 | 7 | 55 |
| | Paraffin Type | Kristol 352 (Exxon) | 30 | — | 30 | — | — | — | 30 | 10 | — | — | — | — | — |
| Antioxidant | Irganox 1010 (Ciba Geigy) | | 1 | 1 | 1 | 1 | 1 | 1 | 1 | 1 | 1 | 1 | 1 | 1 | 1 |
| Ultraviolet Absorber | Tinuvin P (Ciba Geigy) | | 0.5 | 0.5 | 0.5 | 0.5 | 0.5 | 0.5 | 0.5 | 0.5 | 0.5 | 0.5 | 0.5 | 0.5 | 0.5 |
| Total | | | 101.5 | 101.5 | 101.5 | 101.5 | 101.5 | 101.5 | 101.5 | 101.5 | 101.5 | 101.5 | 101.5 | 101.5 | 101.5 |

TABLE 4

| | | Comparison Examples | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Initial Adhesion (g/25 mm at 125° C.) | to silk | 250 | 250 | 400 | 500 | 300 | 200 | 500 | 400 | 200 | 200 | 300 | 200 | 400 |
| | to nylon | 200 | 200 | 400 | 500 | 200 | 100 | 500 | 400 | 100 | 100 | 300 | 100 | 400 |
| | to polyester | 200 | 150 | 400 | 400 | 200 | 100 | 400 | 400 | 100 | 100 | 400 | 100 | 400 |
| Adhesion on aging (g/25 mm at 140° C.) | to silk | 400 | 350 | 500 | 500 | 350 | 400 | 400 | 400 | 350 | 200 | 400 | 300 | 150 |
| | to nylon | 350 | 350 | 400 | 500 | 250 | 350 | 400 | 350 | 300 | 150 | 300 | 350 | 100 |
| | to polyester | 300 | 200 | 500 | 500 | 250 | 350 | 450 | 350 | 300 | 100 | 300 | 300 | 100 |
| Peel off from clothes | | Δ | Δ | X | X | X | ○ | X | X | ○ | ○ | X | ○ | X |
| Heat Resistance (180° C. × 12 hrs) | color | ○ | ○ | ○ | X | X | ○ | ○ | ○ | ○ | ○ | ○ | ○ | ○ |
| | odor | ○ | ○ | ○ | X | X | ○ | ○ | ○ | ○ | ○ | ○ | ○ | ○ |

From the results in Table 4 above, it can be seen that the comparison example articles show undesirable properties with respect to adhesiveness, peeling ability from the underlayer, or thermal stabilities (hue or odor). In contrast to them, the actual example articles, as shown completely prevented. Moreover, since this composition also has an excellent ability to peel away from the underlayer, no adhesive remains on the underlayer when the napkin, etc. is removed after use. Moreover, since hydrogenated tackifying resins are used, it has excellent thermal stability and there is no need to be concerned about color or odor even when the napkin, etc., is heated in the manufacturing process. Consequently, the hot melt adhesive composition of this invention is an ideal adhesive for preventing slipping of napkins, etc.

It is apparent that many variations and modifications of the invention as hereinabove set forth may be made without departing from the spirit and scope thereof. The specific embodiments described are given by way of example only and the invention is limited only by the terms of the appended claims.

What is claimed is:

1. A disposable adsorbent article for adsorbing fluids, with a body facing surface and a garment facing surface, having coated on the garment facing surface an adhesive layer of a hot melt adhesive composition for both preventing slipping and ease of removability, said adhesive composition comprising:

10–30% styrene-ethylene-propylene-styrene block copolymer,
10–20% styrene-ethylene-butylene-styrene block copolymer,
40–70% hydrogenated tackifying resin, and
10–50% plasticizing oil.

2. The disposable article of claim 1, wherein the adhesive contains from 55–65% of the hydrogenated tackifying resin.

3. The disposable absorbent article of claim 2, wherein the adhesive contains 10–15% styrene-ethylene-propylene-styrene block copolymer, and 20–40% plasticizing oil ingredient.

4. The disposable absorpent article of claim 1, wherein the hydrogenated tackifying resin is selected from the group consisting of hydrogenated aliphatic petroleum resins, hydrogenated aromatic petroleum resins and hydrogenated terpene resins.

5. The disposable absorbent article claim 1, wherein the article is a diaper or sanitary napkin.

6. The disposable article of claim 1, where the adhesive contains from 20–40% of plastcizing oil.

7. The disposable article of claim 1, wherein the adhesive contains from 0.1 to 1% of hindered phenol stabilizer.

* * * * *